Jan. 12, 1954 H. R. CARR 2,666,031
WATER SOFTENING APPARATUS
Filed April 4, 1950
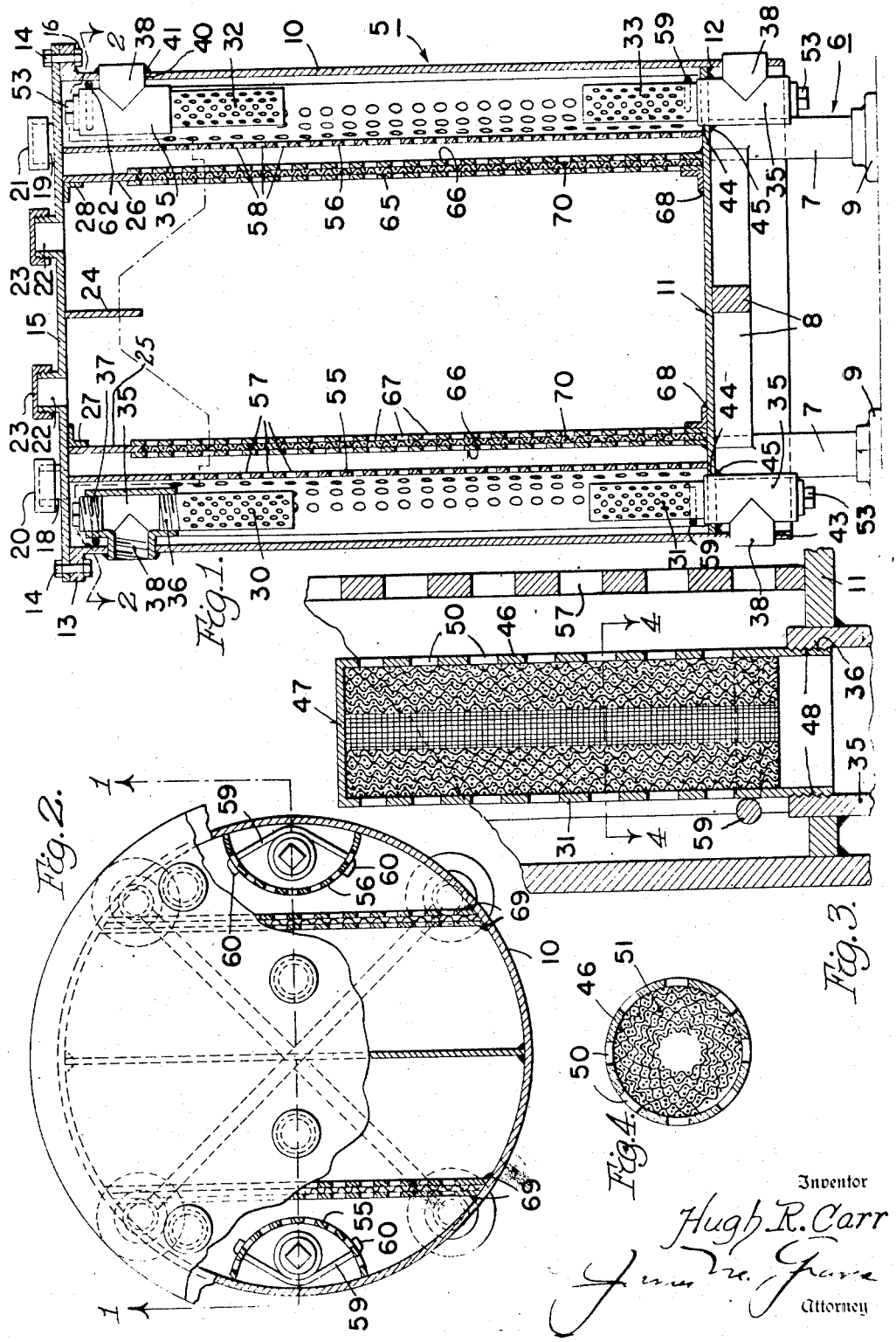
Inventor
Hugh R. Carr
Attorney Patented Jan. 12, 1954

2,666,031

UNITED STATES PATENT OFFICE 2,666,031

WATER SOFTENING APPARATUS

Hugh R. Carr, Cranford, N. J., assignor to Engineering Equipment Distributors, Inc., Kenilworth, N. J., a corporation of New Jersey Application April 4, 1950, Serial No. 153,934

6 Claims. (Cl. 210—24)

The present invention relates to improvements in water softeners, and more particularly to a water softening apparatus employing the well known acid-exchange and base-exchange processes, which include passing the water through a bed of minerals capable of removing the calcium and magnesium salts in so-called hard water, also technically known as cat-ion exchange. The present invention also relates to water softening equipment also adaptable to an ion-exchange which is used with what is commonly known as de-mineralizing.

Generally, devices of this type are provided with regenerating or reviving means for the minerals of the water softener apparatus such that an acid solution or sodium salt solution may be passed through the bed of minerals to restore the same and revive or regenerate the minerals in the bed, this applying to acid softening, base softening, and de-mineralizing with the same apparatus.

One object of the invention is to provide a vertical tank type water softening apparatus having a pair of strainer elements arranged at diametral points within the tank so that the water flow may pass horizontally or selectively between one of each pair of strainer elements.

Another object is to provide a vertical tank type water softener apparatus in which the strainer elements at diametral points are removable to facilitate cleaning and repairing.

Another object is to provide a water softener apparatus of the vertical tank type having coarse gravel compartments at diametral points, which when filled with coarse gravel will surround and embed the strainer elements.

Another object is to provide a vertical tank type cross flow water softener apparatus having approximately semi-circular casing sections for the coarse gravel compartment which are removably affixed to the upper and lower strainer elements at diametral points to permit their removal and easy installation for such purposes as cleaning and repairing.

Another object is to provide vertical screen members which are arranged in substantially parallel relation and extend from the bottom of the tank to the top where they terminate a short distance therefrom to form baffle members. The space between the approximately semi-circular perforated wall members supported by the filters, and vertical screening members forming a compartment for fine gravel, such that in either direction of water flow the water will pass through coarse gravel first, fine gravel second, and after passing through the zeolite or mineral bed will pass through another layer of fine gravel, as well as another layer of coarse gravel.

Another object is to provide a vertical type horizontal flow water softener apparatus having partition screens which are formed of screen elements which are sandwiched between a pair of perforated partition plates, which are supported at the lower ends in the bottom of the tank, and are supported at their upper ends through downwardly extending baffle members. The choice of materials in the plates, screens, baffles, etc., would depend on whether the apparatus is to be used with mineral functioning in acid-softening, base softening, or with de-mineralization softening.

Another object is to provide a vertical tank type horizontal flow water softener in which the removal of mud can be facilitated by directing currents of water in either direction between each pair of strainer elements, and if desired, obliquely between upper and lower strainer elements of each pair, such that the flow will be oblique.

Another object is to provide a water softening apparatus in which the reviving or regenerating solution can be passed through the tank in either direction of horizontal flow between the pairs of strainer elements or obliquely between selected upper and lower strainer elements of each pair.

Another object is to provide a vertical tank type water softening apparatus in which the flow of the water softening, cleaning, and reviving cycle may be reversed after each cycle to insure more efficient and economical operation of the water softening apparatus.

Another object is to provide a water softener apparatus of the horizontal flow vertical tank type which is provided with a removable cover to enable access to be had to the various strainer elements, and to provide removable closure members in the cover to facilitate replacement of the minerals in the bed and the gravel in the gravel compartments.

Another object is to provide a water softening apparatus of the reversable horizontal flow type in which water may be directed to the gravel bed vertically in either direction to facilitate the removal of mud therefrom.

Other objects and advantages of the invention will become apparent during the course of the following description of the accompanying drawing wherein:

Figure 1 is a vertical cross-sectional view of the vertical tank horizontal flow water softener embodying the invention taken on line 1—1 of Figure 2 and looking in the direction of the arrows to illustrate the pair of upper and lower strainer elements arranged at diametral points in the vertical tank.

Figure 2 is a horizontal cross-sectional view taken on the zig-zag line 2—2 of Figure 1 and looking in the direction of the arrows to illustrate the gravel compartments at diametral points within the tank and showing the manner in which the coarse and fine gravel compartments are formed by the semi-cylindrical perforated wall member and the vertical screen partition members.

Figure 3 is an enlarged fragmentary cross-sectional view taken through a portion of the tank and showing one of the strainer elements in section to illustrate various details of construction, and the manner in which the same is removably supported within the tank, and Figure 4 is a horizontal cross-sectional view taken on line 4—4 of Figure 3 and looking in the direction of the arrows to illustrate the manner in which the rolled strainer screen is removably and slidably received in the strainer element casing.

In the drawing, and more in detail, there is shown for the purpose of convenience of illustration a cylindrical tank generally designated 5 supported on a stand likewise generally designated 6. The stand 6 includes vertical standards 7 which are connected by cross arms 8, and said arms have their ends welded or otherwise affixed to the supports 7, and to the tank 5. Foot members 9 are mounted on the lower ends of the supports as shown in Figure 1. The shell can be any shape, not necessarily round.

The tank 5 includes a cylindrical shell 10 having a bottom wall 11 which is welded to the shell 10 a slight distance from the end thereof as at 12. The bottom wall 11 rests upon the supporting frame structure formed by the vertical standards 7 and the cross arm braces 8. The bottom wall may be also dished, rather than flat, and then braces 8 would not be necessary.

The upper end of the cylindrical shell 10 is flanged as at 13, and is provided with a series of circumferentially spaced apart openings for receiving fastening elements 14 which pass through correspondingly positioned openings in a disk shaped cover 15 to securely hold said cover in place, the bolts 14 being provided with retaining nuts 16 for clamping the cover in position. The removable disk shaped cover 15 is provided with access openings 18 and 19 provided with suitable covers 20 and 21 which are threaded or otherwise held in place. In addition, the cover 15 is provided with access openings 22 having removable covers 23 threaded or otherwise secured in place, and said access openings 22 are arranged above the zeolite bed to enable the same to be replenished as the minerals become packed during use.

Secured to the underside of the cover 15 is a diametrically extending depending baffle wall 24, and on each side thereof is arranged and secured baffle walls 25 and 26 secured to angle irons 27 and 28 which extend in approximately parallel relation and through a chordal distance across the bottom wall of the top 15. The angle brackets 27 and 28 are welded to the underside of the cover disk 15, and the depending baffle walls 25 and 26 are similarly welded to the other flange of the angle bracket strips 27 and 28.

Mounted at diametral points in the tank 10 is a pair of upper and lower strainer elements 30—31 and 32—33. The strainer elements 30—31 being located on one side of the tank and the strainer elements 32—33 on the other side diametrically opposite the upper and lower strainer elements 30—31. All of the strainer elements 30—31 and 32—33 are identical in construction and include a T fitting 35 having internally threaded end portions 36 and 37. Also, each T fitting 35 includes a lateral port 38 which is likewise internally threaded (Figure 1). The T fittings 35 supporting the upper strainer elements 30 and 32 have their lateral port portions 38 extending through openings 40 in the upper end of the cylinder 10, which openings are formed at diametral points. The lateral port portions 38 are welded in place as at 41 such that the axis of the T fittings 35 is vertical.

The lower strainer elements 31 and 33 are supported by T fittings 35 which have their lateral port portions 38 extending through openings 43 in the cylinder or tank 10, while the T portions have one end projecting through openings 44 in the bottom wall 11 of the vertical tank. The T fittings 35 are anchored in the openings in the bottom wall 11 of the tank by welding at the points indicated at 45.

The strainer elements 30—31 and 32—33 being all similar in construction, a description of one will suffice for all, and as shown in Figure 3 each strainer element comprises an approximately cylindrical casing 46 having one end closed by means of an end wall 47, and the opposite end externally threaded as at 48. The cylindrical wall of the strainer casing 46 is provided with a series of circumferentially spaced superposed openings 50 for the passage of water. Thus, the strainer casing 46 may have its externally threaded portion 48 received in the correspondingly internally threaded portion 36 of the T joints 35 to be removably held in position.

Mounted in each of the strainer casings 46 is a rolled reticulated screen element 51 which is formed of stainless steel screening strip rolled to a diameter to fit snugly within the strainer casing 46 (Figs. 3 and 4). Thus, the lateral port portions 38 of the pair of upper and lower T fittings 35 at each side of the tank can be connected to suitable reversible flow control valves by piping as illustrated in the Apeldorn patent, No. 1,797,708, issued March 24, 1931, such that water flow can be directed horizontally or diametrically of the tank from one pair of strainer elements 30—31 to the opposite pair 32—33. In systems of this type, reversing valves are employed so that water can be admitted to the tank through the strainer elements 30—31 to the strainer elements 32—33, or from the strainer elements 32—33 to the strainer elements 30—31. The construction and arrangement of the valves and piping for accomplishing this is old and well known as shown in the Apeldorn patent, as is also the use of multiport disk or cylinder valves for the same purpose.

Each of the T fittings 35 is provided with a closure plug 53 in its T portion end opposite the filter supporting end, and as shown in Fig. 1, the closure plugs 53 are received in the internally threaded portions 37 of the T fittings 35 such that easy access may be had thereto, since the lower fittings 35 are mounted externally of the vertical tank floor 11. The upper closure plugs 53 may be easily removed to facilitate removal and replacement of the strainer screen 51 by removing the tank cover 15 after the retaining bolts 14 have been displaced.

Surrounding each pair of strainer elements

30—31 and 32—33 is a semi-cylindrical partition wall 55 and 56 having perforations 57 and 58 throughout their length. The semi-cylindrical partition walls 55 and 56 extend from the bottom wall 11 of the tank 10 to the removable cover 15, and the lower portion of each perforated approximately semi-cylindrical baffle member 55 and 56 is provided with a strap or bar 59 which has its ends bent as at 60 to secure the same in position so that the bars 59 may pass around or in back of the lower strainer elements 31 and 33, and thus hold the semi-cylindrical perforated partition screens in position with the end edges in abutting relationship against the inner peripheral surface of the tank 10. Similarly, bars 62 are connected to the upper end of the semi-cylindrical baffle screen 57 so that they will pass behind the upper ends of the upper T fittings 35 designated 30 and 32. Thus, when the cover 15 is removed the semi-cylindrical baffle screens 55 and 56 can be removed vertically since the lower bars 59 will slide uwardly on the lower strainer elements 31 and 33, while the upper supporting bars 62 may slide upwardly over the top portions of the upper T fittings 35.

The space between the inner peripheral wall of the tank 10 and the semi-cylindrical baffle screens 55 and 56 is adapted to be filled with coarse gravel such that the gravel will enclose the strainer elements 30—31 and 32—33, with the strainer elements embedded in the coarse gravel (not shown). Other arrangements of strainers and coarse gravel compartments is not important, the essential details being that there are two at the top and two at the bottom.

Additional screen partitions are spaced from the semi-cylindrical partition screens 55 and 56 and include perforated partition walls 65 and 66, which are spaced a slight distance apart and are provided with perforations 67 arranged in alinement one with the other. The lower ends of the screen partitions 65 and 66 are welded to the tank floor 11 as at 68, and similarly, the vertical side edges are welded to the inner peripheral wall as at 69. The upper edges of the perforated baffle plates 65 and 66 are supported on opposite sides of the depending baffles 25 and 26, and preferably, the lower edges of the depending baffles 25 and 26 are slidably received between the spaced upper ends of the vertical baffle screens 65 and 66 to permit easy removal of the tank cover 15. On small tanks the method of sealing the baffles must be modified to permit assembly without welding.

Sandwiched between the vertical baffle screen plates 65 and 66 is a reticulated screen element 70 which is formed of wire screening similar to that forming the filter element 51. The space between the adjacent semi-cylindrical partition screens 55 and 56 and the vertical partition plates 65 and 66 is adapted to be filled with fine gravel such that in either direction of water flow from the strainer elements 30—31 and 32—33 beds of coarse and fine gravel will be encountered before passing to the zeolite between the vertical perforated partition plates 65 and 66. After the water passes through the zeolite in either direction of water travel, it again encounters a bed of fine gravel as well as a bed of coarse gravel before passing to its point of use through the strainer elements 30—31 and 32—33.

The space between the spaced apart screens 67 may be filled with zeolite or other mineral material so that the hard water will be softened by the removal of calcium and magnesium salts, or as a part of the de-mineralization cycle, and when the zeolite is revived or regenerated when a brine solution is passed in a direction opposite to the previous direction of water flow by admitting the brine solution to one or both of either pair of strainer elements 30—31 and 32—33, so that the flow will be through the zeolite in a direction opposite to the previous water flow which would have been the softening process.

Before the zeolite has been revived or regenerated, water may be passed either upwardly or downwardly between both pairs of strainer elements 30—31 and 32—33 to remove the mud in the coarse and fine gravel. Suitable pipes and valves being provided for supplying water to one of each pair of strainer elements 30—31 and 32—33, in which event the other of said strainer elements may be connected to a drain likewise by suitable pipes and valves (not shown).

After the zeolite has been revived by passing a brine solution therethrough, either horizontally or obliquely between one or both of the pairs of strainer elements 30—31 and 32—33 and the mud has been removed from the gravel, the fittings 35 are again connected to a source of water supply and usage such that the flow will be in the same direction either horizontal or obliquely, as when previously regenerating. That is to say, the water flow for the next cycle of operations would be in a direction counter to the flow of water when being just previously softened.

Thus it will be seen, that the flow through the strainer elements 30—31 and 32—33 may be so controlled as to selectively employ the strainer elements 30 and 33 or 32 and 31 for the passage of regenerative brine solution, or the flow may be from the strainer element 33 to the strainer element 30 or 32 to 31. By selecting different strainer elements for the supply and exhaust of the brine solution passage the zeolite contained in the tank can be more completely revived, and similarly the direction of water flow may be selected such that the water flow is from strainer elements 30 to 32 or vice-versa, and 31 to 33 or vice-versa. Additionally, hard water may be admitted through one of each pair of strainer elements and exhausted to the supply of use through one or the other upper and lower strainer elements 32—33. The valves for controlling or selectively admitting water to the upper and lower strainer elements of each pair 30—31 and 32—33 are not shown, but two-way valves of conventional type may be employed such that the source and exhaust may be alternately connected to the T fittings 35 of each pair of strainers at diametral points in the approximately cylindrical tank 10.

The openings 18 and 19 are arranged above the fine gravel compartments so that the material may be replenished as it becomes packed from use, and similarly the openings 22 are arranged above the zeolite compartment to likewise facilitate replenishing of the zeolite mineral when the same becomes packed through use.

I claim:

1. In a water softener apparatus, a vertical cylindrical tank, a pair of upper and lower pipe fittings arranged in vertical spaced relation on diametral sides of the tank, cylindrical perforated strainer casings removably connected to each of said pipe fittings, a pair of screen partitions arranged in said tank in spaced apart relation from said strainer elements and from one another to form a central compartment for said mineral material, a semi-cylindrical perforated partition enclosing each pair of upper and lower strainer elements to form chambers on the outer and inner sides thereof for receiving coarse and fine gravel and a cylindrical strainer screen removably mounted in each of said strainer casings, said pipe fittings being arranged to provide a diagonal flow path between an opposed pair of upper and lower fittings.

2. In a water softener apparatus, a vertical cylindrical tank, a pair of upper and lower pipe fittings arranged in vertical spaced relation on diametral sides of the tank, cylindrical perforated strainer casings removably connected to each of said pipe fittings, a pair of screen partitions arranged in said tank in spaced apart relation from said filter elements and from one another to form a central compartment for said mineral material, a semi-cylindrical perforated partition enclosing each pair of filter elements to form chambers on the outer and inner sides thereof for receiving coarse and fine gravel, a cylindrical strainer screen removably mounted in each of said strainer casings and a cover removably affixed to the vertical tank having access openings arranged above the coarse and fine gravel compartments, as well as the mineral material containing compartment, said pipe fittings being arranged to provide obliquely disposed inlet and outlet openings selectively operable to form a diagonal flow path from one side of the tank to the other side.

3. In a water softener apparatus, a vertical cylindrical tank, a pair of upper and lower obliquely disposed inlet and outlet openings in said tank arranged in vertically spaced relation on diametrical sides of the tank to provide a diagonal flow path, cylindrical filter elements covering said openings, a pair of partition screens arranged in the tank in vertical extending horizontal spaced relation to form a central mineral containing compartment, a semi-cylindrical perforated partition removably supported by the vertically spaced filter elements to form a coarse gravel compartment between the tank and said semi-cylindrical partition and to form a fine gravel compartment between each of said semi-cylindrical perforated partitions and the vertical screen partitions.

4. In a water softener apparatus, a vertical cylindrical tank, a pair of upper and lower obliquely disposed inlet and outlet openings in said tank arranged in vertically spaced relation on diametrical sides of the tank to provide a diagonal flow path, cylindrical perforated strainer casings covering said openings, a pair of vertical partition screens mounted in the tank in spaced apart relation to form a central mineral containing compartment, a strainer element formed of a roll of wire screen mounted in each of said strainer casings, a semi-cylindrical perforated partition removably supported by said strainer elements and arranged to provide a coarse gravel compartment in which the strainer elements will become embedded when said compartments are filled with the gravel, said perforated partitions and vertical screen partitions being spaced to form therebetween a fine gravel compartment and a removable cover for said tank having access openings arranged above the mineral and gravel containing compartments.

5. In a water softener apparatus, a vertical cylindrical tank, a pair of upper and lower pipe fittings arranged in vertically spaced relation and extending into the tank on diametral opposed sides thereof, cylindrical strainer casings removably connected to each of said fittings, a removable closure plug connected to the opposite end of each of said fittings, a cylindrical screen strainer element formed of a coil or wire screening arranged in each of said strainer element casings, a perforated partition of arcuate cross section removably supported at its top and bottom on each pair of vertically spaced pair of said strainer elements, a pair of vertical partition screens arranged in said tank in spaced apart relation and interposed between the strainer casings to form therebetween a mineral containing compartment and fine gravel containing compartments on opposite sides thereof between said screen partitions and arcuate perforated partitions, said perforated partitions forming between the inner periphery of the tank compartments to receive coarse gravel which when filled embed said strainer casings and a removable cover for the upper end of said vertical tank having depending baffle plates arranged between and above said screen partitions, said upper and lower pipe fittings being arranged to form inlet and outlet openings of a diagonal flow path.

6. In a water softener apparatus, a vertical cylindrical tank, a pair of upper and lower pipe fittings arranged in vertically spaced relation and extending into the tank on each of the diametral opposed sides thereof, cylindrical filter casings removably connected to each of said fittings, a removable closure plug connected to the opposite end of each of said fittings, a cylindrical screen strainer element formed of a coil of wire screening arranged in each of said strainer element casings, a perforated partition of arcuate cross section removably supported at its top and bottom on said strainer elements, a pair of vertical partition screens arranged in said tank in spaced apart relation and interposed between the strainer casings to form therebetween a mineral containing compartment and fine gravel containing compartments on opposite sides thereof between said screen partitions and arcuate perforated partitions, said perforated partitions forming between the inner periphery of the tank compartments to receive coarse gravel which when filled embed said strainer casings and a removable cover for the upper end of said vertical tank having depending baffle plates arranged between and above said screen partitions, said vertical partition screens being formed of perforated plates with screening sandwiched therebetween, said pipe fittings being selectively controllable to provide obliquely disposed inlet and outlet openings of a diagonal flow path.

HUGH R. CARR.

References Cited in the file of this patent
UNITED STATES PATENTS

| Number | Name | Date |
|---|---|---|
| 1,652,309 | Kingdon | Dec. 13, 1927 |
| 1,661,488 | McGill | Mar. 6, 1928 |
| 1,685,816 | Kenney | Oct. 2, 1928 |
| 1,747,470 | Duden | Feb. 18, 1930 |
| 1,783,255 | Miller | Dec. 2, 1930 |
| 1,788,510 | Everson | Jan. 13, 1931 |
| 1,797,708 | Apeldorn | Mar. 24, 1931 |
| 1,818,638 | McGill | Apr. 11, 1931 |
| 1,993,142 | Johnson | Mar. 5, 1935 |
| 2,077,003 | Nash | Apr. 13, 1937 |
| 2,326,323 | Benedict | Aug. 10, 1943 |
| 2,432,178 | Shafer | Dec. 9, 1947 |